United States Patent
Yano et al.

(10) Patent No.: US 9,640,813 B2
(45) Date of Patent: May 2, 2017

(54) CELL FRAME, CELL STACK, AND REDOX FLOW BATTERY

(71) Applicant: Sumitomo Electric Industries, Ltd., Osaka-shi, Osaka (JP)

(72) Inventors: Keiji Yano, Osaka (JP); Toshikazu Shibata, Osaka (JP); Takahiro Kumamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 287 days.

(21) Appl. No.: 14/349,267

(22) PCT Filed: Sep. 24, 2012

(86) PCT No.: PCT/JP2012/074403
§ 371 (c)(1),
(2) Date: Apr. 2, 2014

(87) PCT Pub. No.: WO2013/051412
PCT Pub. Date: Apr. 11, 2013

(65) Prior Publication Data
US 2014/0255815 A1   Sep. 11, 2014

(30) Foreign Application Priority Data

Oct. 4, 2011   (JP) .................. 2011-219838
Oct. 4, 2011   (JP) .................. 2011-219914

(51) Int. Cl.
*H01M 8/18* (2006.01)
*H01M 8/04276* (2016.01)
(Continued)

(52) U.S. Cl.
CPC ..... *H01M 8/04283* (2013.01); *H01M 8/0273* (2013.01); *H01M 8/04276* (2013.01);
(Continued)

(58) Field of Classification Search
CPC .................................................. H01M 8/1888
See application file for complete search history.

(56) References Cited

U.S. PATENT DOCUMENTS 4,312,735 A * 1/1982 Grimes .................. C25B 15/06
204/230.2
5,851,694 A   12/1998 Miyabayashi et al.
(Continued)

FOREIGN PATENT DOCUMENTS

CN    202917583 U    5/2013
JP    63-291365 A    11/1988
(Continued)

OTHER PUBLICATIONS

Machine translation of JP 2002-237323A printed Mar. 6, 2016.*
(Continued)

*Primary Examiner* — Maria J Laios
(74) *Attorney, Agent, or Firm* — Ditthavong & Steiner, P.C.

(57) ABSTRACT

A cell frame in which the structure of a positive electrode electrolyte flow path and the structure of a negative electrode electrolyte flow path are different from each other, a cell stack in which the structure of at least one of the positive electrode electrolyte flow path and the negative electrode electrolyte flow path differs between the cell frame positioned at the center and the cell frame positioned at an end, the cell stack being configured such that electrical resistance in at least one of the positive electrode electrolyte flow path and the negative electrode electrolyte flow path increases from the cell frame positioned at the center toward the cell frame positioned at the end, and a redox flow battery utilizing them.

9 Claims, 9 Drawing Sheets

(51) Int. Cl.
　　　*H01M 8/24*　　　(2016.01)
　　　*H01M 8/0273*　　(2016.01)
　　　*H01M 8/20*　　　(2006.01)
　　　*H01M 8/2455*　　(2016.01)

(52) U.S. Cl.
　　　CPC .............. *H01M 8/188* (2013.01); *H01M 8/20* (2013.01); *H01M 8/246* (2013.01); *H01M 8/2455* (2013.01); *Y02E 60/528* (2013.01)

(56) References Cited

U.S. PATENT DOCUMENTS

| 2002/0100681 | A1* | 8/2002 | Kirk | ............... | C25B 15/02 |
| | | | | | 204/263 |
| 2010/0086829 | A1 | 4/2010 | Ridley | | |
| 2014/0255815 | A1 | 9/2014 | Yano et al. | | |

FOREIGN PATENT DOCUMENTS

| JP | 7-176326 | A | | 7/1995 | |
| JP | 10-12261 | A | | 1/1998 | |
| JP | 2002-237323 | | * | 8/2002 | ............. H01M 8/18 |
| JP | 2002-237323 | A | | 8/2002 | |
| JP | 2003-100337 | A | | 4/2003 | |
| JP | 2004-319341 | A | | 11/2004 | |
| JP | 2008-537290 | A | | 9/2008 | |

OTHER PUBLICATIONS

Chinese Office Action for related Chinese Patent Application No. 201210377740.8 dated Jul. 2, 2015, with English-language summary, 10 Pages.

European Office Action for related European Application No. 12837699.3-1359 dated May 26, 2015, 8 pages.

International Search Report for corresponding Application PCT/JP2012/074403, Dated Nov. 20, 2012, 2 pages.

* cited by examiner

FIG.10 PRIOR ART
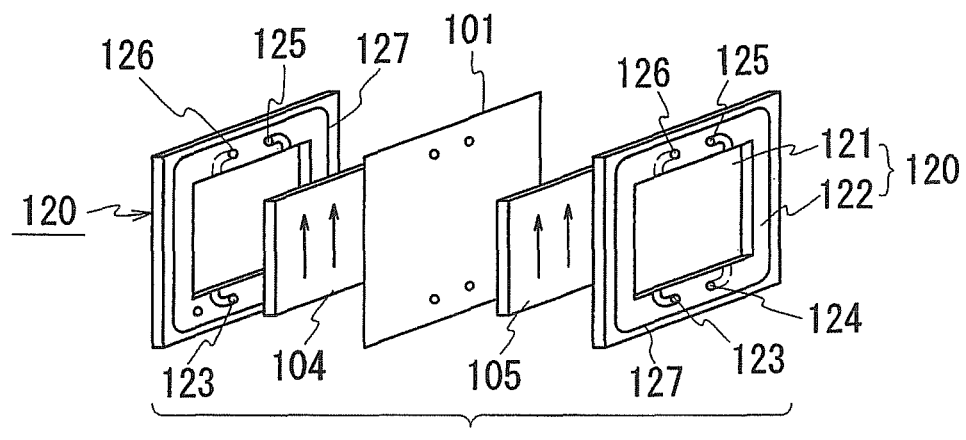
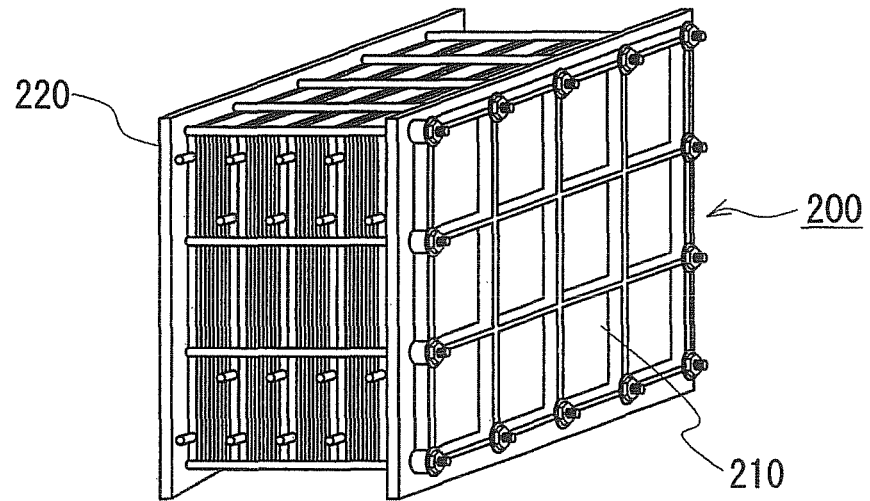

CELL FRAME, CELL STACK, AND REDOX FLOW BATTERY

TECHNICAL FIELD

The present invention relates to a cell frame as a component of a redox flow battery utilized as a large-capacity storage battery, a cell stack utilizing the cell frames, and a redox flow battery utilizing the cell stack.

BACKGROUND ART

A redox flow battery (RF battery) is one of large-capacity storage batteries storing electric power generated by means of renewable energy power generation such as solar photovoltaic power generation and wind power generation. The RF battery is a battery charged and discharged by utilizing the difference in oxidation-reduction potential between an ion contained in a positive electrode electrolyte and an ion contained in a negative electrode electrolyte. FIG. 9 illustrates the principle of operation of a conventional RF battery 300 containing a vanadium ion as its ion.

As shown in FIG. 9, RF battery 300 includes a cell 100 in which a positive electrode cell 102 and a negative electrode cell 103 are separated from each other by an ion exchange film 101 through which hydrogen ions are transmitted. Positive electrode cell 102 includes a positive electrode 104 therein, and is connected via pipes 108 and 110 to a positive electrode electrolyte tank 106 storing a positive electrode electrolyte. Negative electrode cell 103 includes a negative electrode 105 therein, and is connected via pipes 109 and 111 to a negative electrode electrolyte tank 107 storing a negative electrode electrolyte. The electrolytes stored in tanks 106 and 107 are circulated through cells 102 and 103 by pumps 112 and 113, respectively.

RF battery 300 usually utilizes a structure referred to as a cell stack including a plurality of stacked cells 100 (see Patent Document 1 (Japanese Patent Laying-Open No. 2002-237323) and Patent Document 2 (Japanese Patent Laying-Open No. 2004-319341), for example). FIG. 10 is a schematic structural diagram of a conventional cell stack. A cell stack 200 is formed by repeatedly stacking a cell frame 120 having a bipolar plate 121 integrated with a frame body 122, positive electrode 104, ion exchange film 101, and negative electrode 105 in this order, and sandwiching and clamping the stack between two end plates 210 and 220.

In cell stack 200, one cell is formed between adjacent cell frames 120. In cell stack 200, the electrolytes pass through a positive electrode liquid supply manifold 123, a negative electrode liquid supply manifold 124, a positive electrode liquid discharge manifold 125, and a negative electrode liquid discharge manifold 126 that are formed in frame body 122.

Specifically, the positive electrode electrolyte is supplied from positive electrode liquid supply manifold 123 to positive electrode 104 through a slit formed on one surface side (front side in the plane of the figure) of frame body 122, and is discharged to positive electrode liquid discharge manifold 125 through a slit formed in an upper portion of frame body 122. The negative electrode electrolyte is supplied from negative electrode liquid supply manifold 124 to negative electrode 105 through a slit formed on the other surface side (rear side in the plane of the figure) of frame body 122, and is discharged to negative electrode liquid discharge manifold 126 through a slit formed in an upper portion of frame body 122.

An annular sealing member 127 such as an O ring or a flat gasket is arranged between cell frames 120, to prevent leakage of the electrolytes from between cell frames 120.

CITATION LIST

Patent Documents

PTD 1: Japanese Patent Laying-Open No. 2002-237323
PTD 2: Japanese Patent Laying-Open No. 2004-319341

SUMMARY OF INVENTION

Technical Problem

In conventional RF battery 300, the structures of flow paths for the positive and negative electrode electrolytes provided in cell frame 120 (the lengths of the slits connecting the manifolds to the bipolar plate, the cross-sectional shapes and cross-sectional areas, etc.) are identical. This, however, can be problematic in operating RF battery 300.

In RF battery 300, the positive electrode electrolyte and the negative electrode electrolyte often have different viscosities. Thus, when the flow path structure of the positive electrode electrolyte and the flow path structure of the negative electrode electrolyte are identical, an unbalanced pressure acts on ion exchange film 101 in the cell and bipolar plate 121 due to the difference in viscosity between the positive electrode electrolyte and the negative electrode electrolyte, which may cause damage to these members.

That is, as described above, the positive electrode electrolyte passes between bipolar plate 121 and one surface of ion exchange film 101 in RF battery 300, while the negative electrode electrolyte passes between bipolar plate 121 and the other surface of ion exchange film 101. If the negative electrode electrolyte has a viscosity higher than that of the positive electrode electrolyte, the pressure of the negative electrode electrolyte acting on bipolar plate 121 and ion exchange film 101 is higher than the pressure of the positive electrode electrolyte, which may cause damage to bipolar plate 121 and ion exchange film 101.

In operating RF battery 300, there are also times when it is desirable to generate a pressure difference between the positive electrode side and the negative electrode side on purpose. In this case, however, a desired pressure difference exists rather than a pressure difference that can be simply generated. In conventional RF battery 300 having the identical flow path structures between the positive electrode side and the negative electrode side, the pressure difference between the positive electrode side and the negative electrode side depends significantly on the viscosities of the positive electrode electrolyte and the negative electrode electrolyte. Therefore, the desired pressure difference may not be achieved even with adjustment of outputs of the pumps that deliver the electrolytes.

In addition, the plurality of cell frames 120 forming conventional cell stack 200 have identical structures, and thus also have identical flow path structures.

It is also known that a loss due to a shunt current (shunt current loss) occurs in RF battery 300 when charging and discharging RF battery 300 by circulating the positive and negative electrolytes. It is desired to reduce the shunt current loss in order to improve energy efficiency of RF battery 300.

The present invention has been made in view of the situation above, and an object of the present invention is to provide a cell frame capable of adjusting a pressure difference between the pressure of a positive electrode electrolyte and the pressure of a negative electrode electrolyte acting on a member inside a cell. Another object of the present invention is to provide a cell stack utilizing the cell frames according to the present invention, and a redox flow battery utilizing the cell stack.

Another object of the present invention is to provide a cell stack capable of reducing the shunt current loss. Another object of the present invention is to provide a redox flow battery utilizing the cell stack according to the present invention.

Solution to Problem

A cell frame according to the present invention includes a frame body and a bipolar plate integrated with the frame body, the frame body including manifolds provided through the frame body, a positive electrode electrolyte flow path provided on one surface side of the frame body, and a negative electrode electrolyte flow path provided on the other surface side of the frame body, the structure of the positive electrode electrolyte flow path and the structure of the negative electrode electrolyte flow path being different from each other.

Here, the manifolds include a positive electrode liquid supply manifold and a positive electrode liquid discharge manifold through which a positive electrode electrolyte passes, and a negative electrode liquid supply manifold and a negative electrode liquid discharge manifold through which a negative electrode electrolyte passes. The positive electrode electrolyte flow path is formed of a positive electrode side inlet slit for introducing the positive electrode electrolyte from the positive electrode liquid supply manifold to a positive electrode provided on one surface side of the bipolar plate, and a positive electrode side outlet slit for discharging the positive electrode electrolyte from the positive electrode to the positive electrode liquid discharge manifold. The negative electrode electrolyte flow path is formed of a negative electrode side inlet slit for introducing the negative electrode electrolyte from the negative electrode liquid supply manifold to a negative electrode provided on the other surface side of the bipolar plate, and a negative electrode side outlet slit for discharging the negative electrode electrolyte from the negative electrode to the negative electrode liquid discharge manifold.

A cell stack according to the present invention is formed by stacking a cell frame, a positive electrode, a negative electrode, and an ion exchange film a plurality of times, the cell frame being the cell frame according to the present invention.

A redox flow battery according to the present invention includes a cell stack, a positive electrode circulation mechanism for circulating a positive electrode electrolyte through the cell stack, and a negative electrode circulation mechanism for circulating a negative electrode electrolyte through the cell stack, the cell stack being the cell stack according to the present invention. The circulation mechanisms each include a tank storing the electrolyte, a pipe for delivering the electrolyte from the tank to a cell, a pipe for returning the electrolyte from the cell to the tank, and a pump for circulating the electrolyte.

As indicated by the above structure of the present invention, by providing different structures of the positive electrode electrolyte flow path forming a flow path for the positive electrode electrolyte and the negative electrode electrolyte flow path forming a flow path for the negative electrode electrolyte, the electrolytes passing through the slits can have different pressure losses. The pressure difference between the pressure of the positive electrode electrolyte and the pressure of the negative electrode electrolyte at a position of the bipolar plate (location where the electrodes are arranged) can be readily adjusted by the degrees of the pressure losses. When the positive electrode electrolyte and the negative electrode electrolyte have different viscosities, for example, the pressure difference can be reduced, or can be substantially eliminated. Since the pressure difference between the positive and negative electrodes can be readily adjusted, when generating a pressure difference between the positive and negative electrodes on purpose, a desired value of that pressure difference can be readily attained.

The structure of the cell frame according to the present invention will now be described in more detail.

When causing the positive electrode electrolyte and the negative electrode electrolyte having different viscosities to have the same pressure at the position of the bipolar plate in the cell frame according to the present invention, reducing the pressure loss in the electrolyte having a higher viscosity, or increasing the pressure loss in the electrolyte having a lower viscosity can be selected. It is preferable to select the former option in consideration of a load on the members forming the cell.

When providing different structures of the positive electrode electrolyte flow path and the negative electrode electrolyte flow path in the cell frame according to the present invention, only the structures of the outlet slits forming the flow paths may be different, only the structures of the inlet slits may be different, or the structures of both slits may be different, as indicated below.

(1) Only the Structures of the Outlet Slits are Different

The structure of the positive electrode side inlet slit=The structure of the negative electrode side inlet slit The structure of the positive electrode side outlet slit≠The structure of the negative electrode side outlet slit (2) Only the Structures of the Inlet Slits are Different The structure of the positive electrode side inlet slit≠The structure of the negative electrode side inlet slit The structure of the positive electrode side outlet slit=The structure of the negative electrode side outlet slit (3) The Structures of Both Inlet Slits and Outlet Slits are Different The structure of the positive electrode side inlet slit≠The structure of the negative electrode side inlet slit The structure of the positive electrode side outlet slit≠The structure of the negative electrode side outlet slit The following are four typical and specific methods of providing different structures of flow paths each formed of an inlet slit and an outlet slit.

(A) Provide different lengths of slits of both electrolyte flow paths (B) Provide different cross-sectional shapes of at least a portion of both electrolyte flow paths (C) Provide different cross-sectional areas of at least a portion of both electrolyte flow paths (D) Provide different numbers of slits forming both electrolyte flow paths The above methods (A) to (D) may be employed alone, or at least two of the methods (A) to (D) may be employed in combination.

When providing different lengths of slits (namely, different total lengths of the inlet slits and outlet slits) of both electrolyte flow paths as in the above method (A), a pressure loss in the electrolyte increases as the slit length increases. When increasing the pressure of the positive electrode electrolyte, for example, the length of the slits of the positive electrode electrolyte flow path is made longer than the length of the slits of the negative electrode electrolyte flow path. When reducing the pressure of the positive electrode electrolyte, the length of the slits of the positive electrode electrolyte flow path is made shorter than the length of the slits of the negative electrode electrolyte flow path.

When providing a plurality of inlet slits and outlet slits as in the method (D) described later, one equivalent slit that generates a pressure loss equivalent to that of the plurality of slits may be determined to determine the lengths of the positive and negative slits (the equivalent slit having a constant cross-sectional area and a constant cross-sectional shape). When there are three inlet slits and two outlet slits on both positive and negative sides, for example, first, for the positive electrode side, one equivalent slit that generates a pressure loss equivalent to that of the three inlet slits is determined by calculation, and one equivalent slit that generates a pressure loss equivalent to that of the two outlet slits is determined by calculation. The total length of the equivalent slit on the inlet side and the equivalent slit on the outlet side is considered as the length of the slits of the positive electrode electrolyte flow path. Then, for the negative electrode side, equivalent slits having a cross-sectional area and cross-sectional shape the same as those of the equivalent slits on the positive electrode side (namely, equivalent slits having conditions the same as those on the positive electrode side other than the length) are determined by calculation, to determine the length of the slits of the negative electrode electrolyte flow path. Then, the lengths of the equivalent slits are compared between the positive and negative sides.

When providing different cross-sectional shapes of at least a portion of both electrolyte flow paths as in the above method (B), a pressure loss increases as the cross-sectional shape becomes more complicated. To compare a slit having a semicircular cross section and a slit having a polygonal, for example, rectangular, cross section, the pressure loss is higher in the latter than in the former.

When providing different cross-sectional areas of at least a portion of both electrolyte flow paths as in the above method (C), a pressure loss increases as the cross-sectional area decreases. This does not necessarily apply, however, when in combination with the method (D) described next.

When providing different numbers of slits forming both electrolyte flow paths as in the above method (D), with the total cross-sectional areas of the slits being the same between the positive electrode side and the negative electrode side, a pressure loss is higher in the electrolyte flow path having a higher number of slits than in the other electrolyte flow path. This is because the area of slits that comes into contact with the electrolyte increases as the number of slits increases. If the total cross-sectional areas of the slits are different between the positive electrode side and the negative electrode side, a pressure loss does not necessarily increase as the number of slits increases.

When providing different structures of the positive electrode electrolyte flow path and the negative electrode electrolyte flow path as in the above methods (A) to (D), the structure of the inlet slit and the structure of the outlet slit forming the positive electrode electrolyte flow path (negative electrode electrolyte flow path) do not need to be identical to each other. That is, the structure of the inlet slit and the structure of the outlet slit may be different from each other in each of the positive electrode electrolyte flow path and the negative electrode electrolyte flow path. For example, the electrolyte may increase in temperature due to heat generated by a shunt current, causing precipitation of a component of the electrolyte. The shunt current during charge may be suppressed by making the outlet slit longer than the inlet slit.

Moreover, the pressure loss in each electrolyte can be adjusted by appropriately combining the above methods (1) to (3) and methods (A) to (D). Particularly, when the structure of the positive electrode side inlet slit and the structure of the negative electrode side outlet slit are identical, and the structure of the positive electrode side outlet slit and the structure of the negative electrode side inlet slit are identical, the pressure loss on the positive electrode side and the pressure loss on the negative electrode side at the positions of the manifolds can be the same while the pressure of the positive electrode electrolyte and the pressure of the negative electrode electrolyte at the position of the bipolar plate are different, as will be described later in a fourth embodiment.

Furthermore, the present inventors studied a shunt current in a cell stack of a conventional RF battery and made the following findings. FIG. 11 illustrates relation between a shunt current (absolute value) and the position of a cell frame in a cell stack including N cell frames stacked. As shown in FIG. 11, it was found that the shunt current absolute value increases from a cell frame positioned at the center (N/2th) toward cell frames positioned at the ends (first and Nth). The present inventors completed the present invention based on such findings.

A cell stack according to the present invention is formed by stacking a cell frame, a positive electrode, an ion exchange film, and a negative electrode a plurality of times. The cell frame includes a frame body and a bipolar plate integrated with the frame body, the cell frame including manifolds provided through the frame body, a positive electrode electrolyte flow path provided on one surface side of the frame body, and a negative electrode electrolyte flow path provided on the other surface side of the frame body. The structures of at least one of the positive electrode electrolyte flow paths and the negative electrode electrolyte flow paths are different between the cell frame positioned at the center of the cell stack and the cell frame positioned at an end of the cell stack, and the cell stack is configured such that electrical resistance in the electrolyte flow paths increases from the cell frame positioned at the center toward the cell frame positioned at the end.

Here, the manifolds include a positive electrode liquid supply manifold and a positive electrode liquid discharge manifold through which a positive electrode electrolyte passes, and a negative electrode liquid supply manifold and a negative electrode liquid discharge manifold through which a negative electrode electrolyte passes. The positive electrode electrolyte flow path is formed of a positive electrode side inlet slit for introducing the positive electrode electrolyte from the positive electrode liquid supply manifold to the positive electrode provided on one surface side of the bipolar plate, and a positive electrode side outlet slit for discharging the positive electrode electrolyte from the positive electrode to the positive electrode liquid discharge manifold. The negative electrode electrolyte flow path is formed of a negative electrode side inlet slit for introducing the negative electrode electrolyte from the negative electrode liquid supply manifold to the negative electrode provided on the other surface side of the bipolar plate, and a negative electrode side outlet slit for discharging the negative electrode electrolyte from the negative electrode to the negative electrode liquid discharge manifold.

According to this structure, the structures of the electrolyte flow paths are different between the cell frame positioned at the center and the cell frame positioned at the end, and electrical resistance in the electrolyte flow paths increases from the cell frame positioned at the center toward the cell frame positioned at the end. In other words, the electrical resistance in the electrolyte flow paths decreases from the cell frame positioned at the end toward the cell frame positioned at the center. As a result, in the cell frame positioned at the end, the shunt current can be suppressed to reduce the shunt current loss.

The structure of the cell stack according to the present invention will now be described in more detail.

Preferably, in the cell stack according to the present invention, the number of the stacked cell frames is 10 or more.

The shunt current in the cell stack tends to increase from the center toward the ends as the number of stacked cell frames increases. When the number of the stacked cell frames is 10 or more, the shunt current increases to a degree at the cell frame positioned at the end, thus sufficiently producing the effect of reducing the shunt current loss.

Preferably, in the cell stack according to the present invention, the electrical resistance in the electrolyte flow paths of the cell frames of ⅔ or more of the number of the stacked cell frames is higher than the electrical resistance in the electrolyte flow paths of the cell frame positioned at the center.

With the electrical resistance in the electrolyte flow paths being higher in the cell frames of ⅔ or more of the number of the stacked cell frames than in the cell frame positioned at the center, the effect of reducing the shunt current loss can be sufficiently produced.

Preferably, the cell stack according to the present invention is configured such that the electrical resistance in the electrolyte flow paths increases continuously or in stages from the cell frame positioned at the center toward the cell frames positioned at the ends. When increasing the electrical resistance in the electrolyte flow paths continuously, it may be increased linearly (according to a linear function, so to speak) or non-linearly. When increasing the electrical resistance in the electrolyte flow paths non-linearly, it may be increased according to a quadratic function, for example.

Since the shunt current in the cell stack increases linearly (according to a linear function) from the center toward the ends (see FIG. 11), the electrical resistance in the electrolyte flow paths correspondingly increases linearly (according to a linear function), thereby effectively reducing the shunt current loss. Furthermore, the electrical resistance in the electrolyte flow paths increases non-linearly (according to a quadratic function, for example), thereby further effectively reducing the shunt current loss.

In the cell stack according to the present invention, when providing different structures of the electrolyte flow paths between the cell frame positioned at the center and the cell frame positioned at the end to vary the electrical resistance in the electrolyte flow paths, the structure of at least one of the inlet slit and outlet slit of the electrolyte flow path may differ between the cell frames.

Specifically, only the structures of the inlet slits forming the flow paths may be different, only the structures of the outlet slits may be different, or the structures of both slits may be different. Here, the inlet slit is filled with the electrolyte at all times, and is therefore a location where a shunt current loss most likely occurs. By providing different structures of the inlet slits, the shunt current loss can be effectively reduced. On the other hand, the outlet slit has a high potential during charge, and is therefore a location where the shunt current increases. By providing different structures of the outlet slits, the shunt current loss can be effectively reduced. Alternatively, by providing different structures of both slits, the shunt current can be suppressed during charge and discharge, thereby further reducing the shunt current loss.

In the cell stack according to the present invention, to provide different structures of the electrolyte flow paths between the cell frame positioned at the center and the cell frame positioned at the end to vary the electrical resistance in the electrolyte flow paths, for example, at least one of the length of the slits, the cross-sectional area of the slits, and the number of the slits may differ between the cell frames.

Specifically, when increasing the electrical resistance, the increase can be realized by increasing the lengths of the slits, reducing the cross-sectional areas of the slits, or reducing the numbers of the slits, of the electrolyte flow paths. When reducing the electrical resistance, the reduction can be realized by reducing the lengths of the slits, increasing the cross-sectional areas of the slits, or increasing the numbers the slits, of the electrolyte flow paths. These methods may be employed alone, or two or more of them may be combined to vary the electrical resistance.

When there are a plurality of slits of the electrolyte flow path, one equivalent slit that generates an electrical resistance equivalent to that of the plurality of slits is determined, and the length of the equivalent slit is considered as the length of the slits of the electrolyte flow path. When there are three inlet slits and two outlet slits on the inlet side and outlet side, respectively, for example, one equivalent slit that generates an electrical resistance equivalent to that of the three inlet slits is determined by calculation, and one equivalent slit that generates an electrical resistance equivalent to that of the two outlet slits is determined by calculation. Then, the total length of the equivalent slit on the inlet side and the equivalent slit on the outlet side is considered as the length of the slits of the electrolyte flow path.

Preferably, in the cell stack according to the present invention, in at least one of the cell frames, the structure of the positive electrode electrolyte flow path and the structure of the negative electrode electrolyte flow path are different from each other.

As described above, in conventional RF battery 300, the flow path structures for the positive and negative electrolytes provided in the cell frame are identical, and this can be problematic in operating RF battery 300.

In an RF battery, the positive electrode electrolyte and the negative electrode electrolyte often have different viscosities. Thus, when the flow path structure of the positive electrode electrolyte and the flow path structure of the negative electrode electrolyte are identical, an unbalanced pressure acts on an ion exchange film in a cell and a bipolar plate due to the difference in viscosity between the positive electrode electrolyte and the negative electrode electrolyte, which may cause damage to these members. As was described with reference to FIG. 10, the positive electrode electrolyte passes between bipolar plate 121 and one surface of ion exchange film 101 in RF battery 300, while the negative electrode electrolyte passes between bipolar plate 121 and the other surface of ion exchange film 101. If the negative electrode electrolyte has a viscosity higher than that of the positive electrode electrolyte, the pressure of the negative electrode electrolyte acting on bipolar plate 121 and ion exchange film 101 is higher than the pressure of the positive electrode electrolyte, which may cause damage to bipolar plate 121 and ion exchange film 101.

In operating RF battery 300, there are also times when it is desirable to generate a pressure difference between the positive electrode side and the negative electrode side on purpose. In this case, however, a desired pressure difference exists rather than a pressure difference that can be simply generated. In conventional RF battery 300 having the identical flow path structures between the positive electrode side and the negative electrode side, the pressure difference between the positive electrode side and the negative electrode side depends significantly on the viscosities of the positive electrode electrolyte and the negative electrode electrolyte. Therefore, the desired pressure difference may not be achieved even with adjustment of outputs of the pumps that deliver the electrolytes.

Thus, as indicated by the above structure, by providing different structures of the positive electrode electrolyte flow path forming a flow path for the positive electrode electrolyte and the negative electrode electrolyte flow path forming a flow path for the negative electrode electrolyte, the electrolytes passing through the slits can have different pressure losses. The pressure difference between the pressure of the positive electrode electrolyte and the pressure of the negative electrode electrolyte at a position of the bipolar plate (location where the electrodes are arranged) can be readily adjusted by the degrees of the pressure losses. When the positive electrode electrolyte and the negative electrode electrolyte have different viscosities, for example, the pressure difference can be reduced, or can be substantially eliminated. Since the pressure difference between the positive and negative electrodes can be readily adjusted, when generating a pressure difference between the positive and negative electrodes on purpose, a desired value of that pressure difference can be readily attained.

A case where the structure of the positive electrode electrolyte flow path and the structure of the negative electrode electrolyte flow path are different from each other in at least one of the cell frames will now be described in more detail.

When causing the positive electrode electrolyte and the negative electrode electrolyte having different viscosities to have the same pressure at the position of the bipolar plate in the cell frame, reducing the pressure loss in the electrolyte having a higher viscosity, or increasing the pressure loss in the electrolyte having a lower viscosity can be selected. It is preferable to select the former option in consideration of a load on the members forming the cell.

When providing different structures of the positive electrode electrolyte flow path and the negative electrode electrolyte flow path in the cell frame, only the structures of the outlet slits forming the flow paths may be different, only the structures of the inlet slits may be different, or the structures of both slits may be different, as indicated below.

(1) Only the Structures of the Outlet Slits are Different
The structure of the positive electrode side inlet slit=The structure of the negative electrode side inlet slit
The structure of the positive electrode side outlet slit≠The structure of the negative electrode side outlet slit (2) Only the Structures of the Inlet Slits are Different
The structure of the positive electrode side inlet slit≠The structure of the negative electrode side inlet slit
The structure of the positive electrode side outlet slit=The structure of the negative electrode side outlet slit (3) The Structures of Both Inlet Slits and Outlet Slits are Different
The structure of the positive electrode side inlet slit≠The structure of the negative electrode side inlet slit
The structure of the positive electrode side outlet slit≠The structure of the negative electrode side outlet slit The following are four typical and specific methods of providing different structures of flow paths each formed of an inlet slit and an outlet slit.

(A) Provide different lengths of slits of both electrolyte flow paths (B) Provide different cross-sectional shapes of at least a portion of both electrolyte flow paths (C) Provide different cross-sectional areas of at least a portion of both electrolyte flow paths (D) Provide different numbers of slits forming both electrolyte flow paths The above methods (A) to (D) may be employed alone, or at least two of the methods (A) to (D) may be employed in combination.

When providing different lengths of slits (namely, different total lengths of the inlet slits and outlet slits) of both electrolyte flow paths as in the above method (A), a pressure loss in the electrolyte increases as the slit length increases. When increasing the pressure of the positive electrode electrolyte, for example, the length of the slits of the positive electrode electrolyte flow path is made longer than the length of the slits of the negative electrode electrolyte flow path. When reducing the pressure of the positive electrode electrolyte, the length of the slits of the positive electrode electrolyte flow path is made shorter than the length of the slits of the negative electrode electrolyte flow path.

When providing a plurality of inlet slits and outlet slits as in the method (D) described later, one equivalent slit that generates a pressure loss equivalent to that of the plurality of slits may be determined to determine the lengths of the positive and negative slits (the equivalent slit having a constant cross-sectional area and a constant cross-sectional shape). When there are three inlet slits and two outlet slits on both positive and negative sides, for example, first, for the positive electrode side, one equivalent slit that generates a pressure loss equivalent to that of the three inlet slits is determined by calculation, and one equivalent slit that generates a pressure loss equivalent to that of the two outlet slits is determined by calculation. The total length of the equivalent slit on the inlet side and the equivalent slit on the outlet side is considered as the length of the slits of the positive electrode electrolyte flow path. Then, for the negative electrode side, equivalent slits having a cross-sectional area and cross-sectional shape the same as those of the equivalent slits on the positive electrode side (namely, equivalent slits having conditions the same as those on the positive electrode side other than the length) are determined by calculation, to determine the length of the slits of the negative electrode electrolyte flow path. Then, the lengths of the equivalent slits are compared between the positive and negative sides.

When providing different cross-sectional shapes of at least a portion of both electrolyte flow paths as in the above method (B), a pressure loss increases as the cross-sectional shape becomes more complicated. To compare a slit having a semicircular cross section and a slit having a polygonal, for example, rectangular, cross section, the pressure loss is higher in the latter than in the former.

When providing different cross-sectional areas of at least a portion of both electrolyte flow paths as in the above method (C), a pressure loss increases as the cross-sectional area decreases. This does not necessarily apply, however, when in combination with the method (D) described next.

When providing different numbers of slits forming both electrolyte flow paths as in the above method (D), with the total cross-sectional areas of the slits being the same between the positive electrode side and the negative electrode side, a pressure loss is higher in the electrolyte flow path having a higher number of slits than in the other electrolyte flow path. This is because the area of slits that comes into contact with the electrolyte increases as the number of slits increases. If the total cross-sectional areas of the slits are different between the positive electrode side and the negative electrode side, a pressure loss does not necessarily increase as the number of slits increases.

When providing different structures of the positive electrode electrolyte flow path and the negative electrode electrolyte flow path as in the above methods (A) to (D), the structure of the inlet slit and the structure of the outlet slit forming the positive electrode electrolyte flow path (negative electrode electrolyte flow path) do not need to be identical to each other. That is, the structure of the inlet slit and the structure of the outlet slit may be different from each other in each of the positive electrode electrolyte flow path and the negative electrode electrolyte flow path. For example, the electrolyte may increase in temperature due to heat generated by a shunt current, causing precipitation of a component of the electrolyte. The shunt current during charge may be suppressed by making the outlet slit longer than the inlet slit.

Moreover, the pressure loss in each electrolyte can be adjusted by appropriately combining the above methods (1) to (3) and methods (A) to (D). Particularly, when the structure of the positive electrode side inlet slit and the structure of the negative electrode side outlet slit are identical, and the structure of the positive electrode side outlet slit and the structure of the negative electrode side inlet slit are identical, the pressure loss on the positive electrode side and the pressure loss on the negative electrode side at the positions of the manifolds can be the same while the pressure of the positive electrode electrolyte and the pressure of the negative electrode electrolyte at the position of the bipolar plate are different, as will be described later in the fourth embodiment.

An RF battery according to the present invention includes a cell stack, a positive electrode circulation mechanism for circulating a positive electrode electrolyte through the cell stack, and a negative electrode circulation mechanism for circulating a negative electrode electrolyte through the cell stack, the cell stack being the cell stack according to the present invention. The circulation mechanisms each include a tank storing the electrolyte, a pipe for delivering the electrolyte from the tank to a cell (cell stack), a pipe for returning the electrolyte from the cell (cell stack) to the tank, and a pump for circulating the electrolyte.

With the cell stack having this structure according to the present invention, the shunt current loss can be reduced. It is thus expected that energy efficiency of the RF battery will be improved.

Advantageous Effects of Invention

According to the cell frame of present invention, when assembling the cell frames into a cell stack to form a redox flow battery, a relative balance between the pressure of the positive electrode electrolyte and the pressure of the negative electrode electrolyte can be adjusted to a desired value regardless of the viscosities of the positive electrode electrolyte and the negative electrode electrolyte.

According to the cell stack of the present invention, the structures of the electrolyte flow paths are different between the cell frame positioned at the center and the cell frame positioned at the end, and the electrical resistance in the electrolyte flow paths increases from the cell frame positioned at the center toward the cell frame positioned at the end. As a result, in the cell frame positioned at the end, the shunt current can be suppressed to reduce the shunt current loss. According to the redox flow battery of the present invention, the shunt current loss can be reduced by using the cell stack of the present invention. It is thus expected that energy efficiency will be improved.

BRIEF DESCRIPTION OF DRAWINGS

FIG. 10 is a schematic structural diagram of a conventional cell stack.

DESCRIPTION OF EMBODIMENTS

Figure 1:
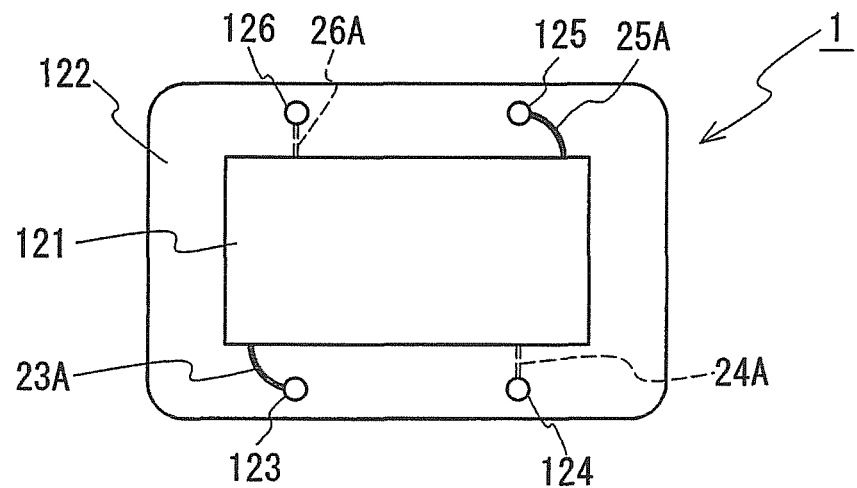
FIG. 1 is a schematic front view of a cell frame according to a first embodiment.

Embodiments of the present invention will be hereinafter described. The same reference signs indicate the same or corresponding elements in the drawings of the present invention. While first to third embodiments (except for a fourth embodiment) will be described below based on the assumption that a negative electrode electrolyte has a viscosity higher than that of a positive electrode electrolyte, the invention is, of course, not limited to this configuration.

First Embodiment

FIG. 1 is a schematic front view of a cell frame according to a first embodiment. In a cell frame 1 according to the first embodiment, the lengths of electrolyte flow paths (the lengths of slits) formed between manifolds 123 to 126 and bipolar plate 121 are different between the positive electrode side and the negative electrode side, so that a pressure difference between the pressure of the positive electrode electrolyte and the pressure of the negative electrode electrolyte at a position of bipolar plate 121 (location where the electrodes are arranged) can be reduced.

Cell frame 1 according to the first embodiment includes a positive electrode electrolyte flow path through which the positive electrode electrolyte passes on a surface side of cell frame 1. The positive electrode electrolyte flow path is formed of a positive electrode side inlet slit 23A extending in the shape of an arc from positive electrode liquid supply manifold 123 toward a lower left end on the surface side of bipolar plate 121, and a positive electrode side outlet slit 25A extending in the shape of an arc from an upper right end on the surface side of bipolar plate 121 toward positive electrode liquid discharge manifold 125.

Cell frame 1 according to the first embodiment also includes a negative electrode electrolyte flow path through which the negative electrode electrolyte passes on a rear surface side of cell frame 1. The negative electrode electrolyte flow path is formed of a negative electrode side inlet slit 24A extending linearly from negative electrode liquid supply manifold 124 toward a lower right end on the rear surface side of bipolar plate 121, and a negative electrode side outlet slit 26A extending linearly from an upper left end on the rear surface side of bipolar plate 121 toward negative electrode liquid discharge manifold 126.

As such, in cell frame 1 according to the first embodiment, the structure of positive electrode side inlet slit 23A and the structure of negative electrode side inlet slit 24A are different, and the structure of positive electrode side outlet slit 25A and the structure of negative electrode side outlet slit 26A are also different. Moreover, the length of the slits of the positive electrode electrolyte flow path is longer than the length of the slits of the negative electrode electrolyte flow path. These relations are represented below.

Positive electrode side inlet slit 23A≠Negative electrode side inlet slit 24A

Positive electrode side outlet slit 25A≠Negative electrode side outlet slit 26A

The length of the slits of the positive electrode electrolyte flow path>The length of the slits of the negative electrode electrolyte flow path In cell frame 1 according to the first embodiment, since the length of the slits of the negative electrode electrolyte flow path is shorter than the length of the slits of the positive electrode electrolyte flow path, a pressure loss in the negative electrode electrolyte flow path can be made smaller than a pressure loss in the positive electrode electrolyte flow path. As a result, the pressure of the negative electrode electrolyte at the position of bipolar plate 121 can be reduced, thereby also reducing a pressure difference between the pressure of the positive electrode electrolyte and the pressure of the negative electrode electrolyte at the position of bipolar plate 121.

While positive electrode side inlet slit 23A, negative electrode side inlet slit 24A, positive electrode side outlet slit 25A and negative electrode side outlet slit 26A have the same cross-sectional area in cell frame 1 according to the first embodiment, they may have different cross-sectional shapes so as to adjust the pressures losses in the positive electrode electrolyte flow path and the negative electrode electrolyte flow path.

For example, if the positive electrode electrolyte flow path has a rectangular cross-sectional shape and the negative electrode electrolyte flow path has a semicircular cross-sectional shape, the pressure loss in the negative electrode electrolyte flow path can be made further smaller than the pressure loss in the positive electrode electrolyte flow path.

The structure where the slits have different cross-sectional shapes can be applied alone, or in combination with structures according to second to fourth embodiments described later.

Second Embodiment

Figure 2:
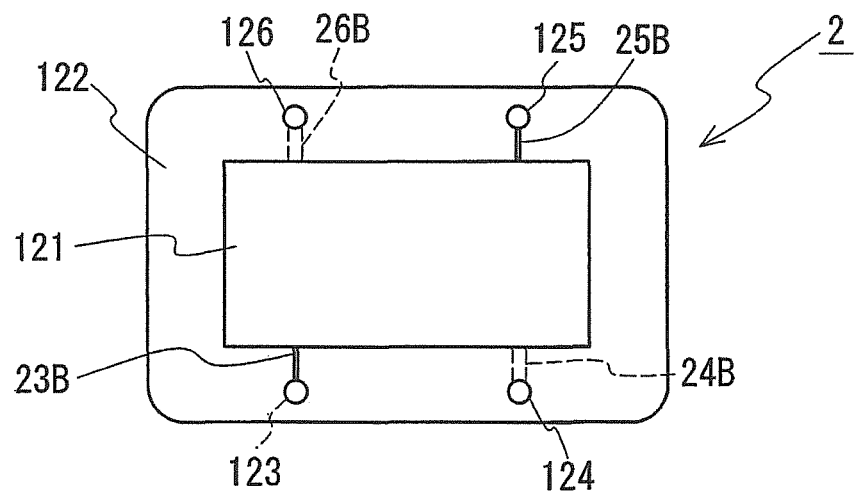
FIG. 2 is a schematic front view of a cell frame according to a second embodiment.

FIG. 2 is a schematic front view of a cell frame according to a second embodiment. In a cell frame 2 according to the second embodiment, the cross-sectional area of the positive electrode electrolyte flow path and the cross-sectional area of the negative electrode electrolyte flow path are different, so that a pressure difference between the pressure of the positive electrode electrolyte and the pressure of the negative electrode electrolyte at the position of bipolar plate 121 (location where the electrodes are arranged) can be reduced.

As in the first embodiment, cell frame 2 according to the second embodiment includes a positive electrode electrolyte flow path on a surface side of cell frame 2, and a negative electrode electrolyte flow path on a rear surface side of cell frame 2.

In cell frame 2 according to the second embodiment, both of a positive electrode side inlet slit 23B and a positive electrode side outlet slit 25B forming the positive electrode electrolyte flow path have a linear structure. Both of a negative electrode side inlet slit 24B and a negative electrode side outlet slit 26B forming the negative electrode electrolyte flow path also have a linear structure. The cross-sectional area of negative electrode side inlet slit 24B and negative electrode side outlet slit 26B is made larger than the cross-sectional area of positive electrode side inlet slit 23B and positive electrode side outlet slit 25B, by making the width of negative electrode side inlet slit 24B and negative electrode side outlet slit 26B larger than the width of positive electrode side inlet slit 23B and positive electrode side outlet slit 25B.

As such, in cell frame 2 according to the second embodiment, the structure of positive electrode side inlet slit 23B and the structure of negative electrode side inlet slit 24B are different, and the structure of positive electrode side outlet slit 25B and the structure of negative electrode side outlet slit 26B are also different. Moreover, the cross-sectional area of positive electrode side inlet slit 23B is smaller than the cross-sectional area of negative electrode side inlet slit 24B, and the cross-sectional area of positive electrode side outlet slit 25B is smaller than the cross-sectional area of negative electrode side outlet slit 26B. These relations are represented below.

Positive electrode side inlet slit 23B≠Negative electrode side inlet slit 24B

Positive electrode side outlet slit 25B≠Negative electrode side outlet slit 26B

The cross-sectional area of positive electrode side inlet slit 23B<The cross-sectional area of negative electrode side inlet slit 24B

The cross-sectional area of positive electrode side outlet slit 25B<The cross-sectional area of negative electrode side outlet slit 26B

In cell frame 2 according to the second embodiment, since the cross-sectional area of the negative electrode electrolyte flow path is larger than the cross-sectional area of the positive electrode electrolyte flow path, a pressure loss in the negative electrode electrolyte flow path can be made smaller than a pressure loss in the positive electrode electrolyte flow path. As a result, the pressure of the negative electrode electrolyte at the position of bipolar plate 121 can be reduced, thereby also reducing a pressure difference between the pressure of the positive electrode electrolyte and the pressure of the negative electrode electrolyte at the position of bipolar plate 121.

The cross-sectional area of negative electrode side inlet slit 24B and negative electrode side outlet slit 26B can be made larger than the cross-sectional area of positive electrode side inlet slit 23B and positive electrode side outlet slit 25B by making the depth of negative electrode side inlet slit 24B and negative electrode side outlet slit 26B deeper than the depth of positive electrode side inlet slit 23B and positive electrode side outlet slit 25B. Alternatively, the different cross-sectional areas may be provided by making both the depth and width of negative electrode side inlet slit 24B and negative electrode side outlet slit 26B different from the depth and width of positive electrode side inlet slit 23B and positive electrode side outlet slit 25B.

Third Embodiment

Figure 3:
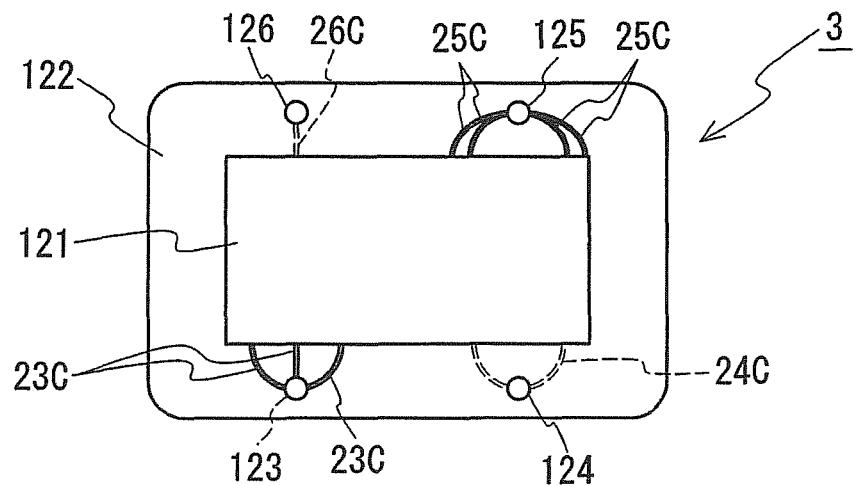
FIG. 3 is a schematic front view of a cell frame according to a third embodiment.

FIG. 3 is a schematic front view of a cell frame according to a third embodiment. In a cell frame 3 according to the third embodiment, the numbers of slits are different between the positive electrode side and the negative electrode side, so that a pressure difference between the pressure of the positive electrode electrolyte and the pressure of the negative electrode electrolyte at the position of bipolar plate 121 (location where the electrodes are arranged) can be reduced.

A positive electrode electrolyte flow path provided on a surface side of cell frame 3 according to the third embodiment is formed of one positive electrode side inlet slit 23C extending linearly, two positive electrode side inlet slits 23C extending in the shape of an arc, and four positive electrode side outlet slits 25C extending in the shape of an arc. A negative electrode electrolyte flow path provided on a rear surface side of cell frame 3 is formed of two negative electrode side inlet slits 24C extending in the shape of an arc, and one negative electrode side outlet slit 26C extending linearly.

As such, in cell frame 3 according to the third embodiment, the structure of positive electrode side inlet slits 23C and the structure of negative electrode side inlet slits 24C are different, and the structure of positive electrode side outlet slits 25C and the structure of negative electrode side outlet slit 26C are also different. Moreover, the number of positive electrode side inlet slits 23C is higher than the number of negative electrode side inlet slits 24C, and the number of positive electrode side outlet slits 25C is higher than the number of negative electrode side outlet slit 26C. Furthermore, the length of the slits of the positive electrode electrolyte flow path (the length of an equivalent slit) is longer than the length of the slits of the negative electrode electrolyte flow path (the length of an equivalent slit). These relations are represented below.

Positive electrode side inlet slits 23C≠Negative electrode side inlet slits 24C
Positive electrode side outlet slits 25C≠Negative electrode side outlet slit 26C
The number of positive electrode side inlet slits 23C>The number of negative electrode side inlet slits 24C
The number of positive electrode side outlet slits 25C>The number of negative electrode side outlet slit 26C
The length of the slits of the positive electrode electrolyte flow path (the length of an equivalent slit)>The length of the slits of the negative electrode electrolyte flow path (the length of an equivalent slit)

Positive electrode side inlet slits 23C, negative electrode side inlet slits 24C, positive electrode side outlet slits 25C and negative electrode side outlet slit 26C have constant cross-sectional shapes along the entire lengths of the slits. The total cross-sectional area of three positive electrode side inlet slits 23C is the same as the total cross-sectional area of two negative electrode side inlet slits 24C, and the total cross-sectional area of four positive electrode side outlet slits 25C is the same as the cross-sectional area of one negative electrode side outlet slit 26C.

In cell frame 3 according to the third embodiment, since the number of the slits forming the negative electrode electrolyte flow path is lower than the number of the slits forming the positive electrode electrolyte flow path, a pressure loss in the negative electrode electrolyte flow path can be made smaller than a pressure loss in the positive electrode electrolyte flow path. As a result, the pressure of the negative electrode electrolyte at the position of bipolar plate 121 can be reduced, thereby also reducing a pressure difference between the pressure of the positive electrode electrolyte and the pressure of the negative electrode electrolyte at the position of bipolar plate 121. Moreover, since the length of the slits of the negative electrode electrolyte flow path is shorter than the length of the slits of the positive electrode electrolyte flow path, a pressure loss in the negative electrode electrolyte flow path can be made smaller than a pressure loss in the positive electrode electrolyte flow path.

Fourth Embodiment

Figure 4:
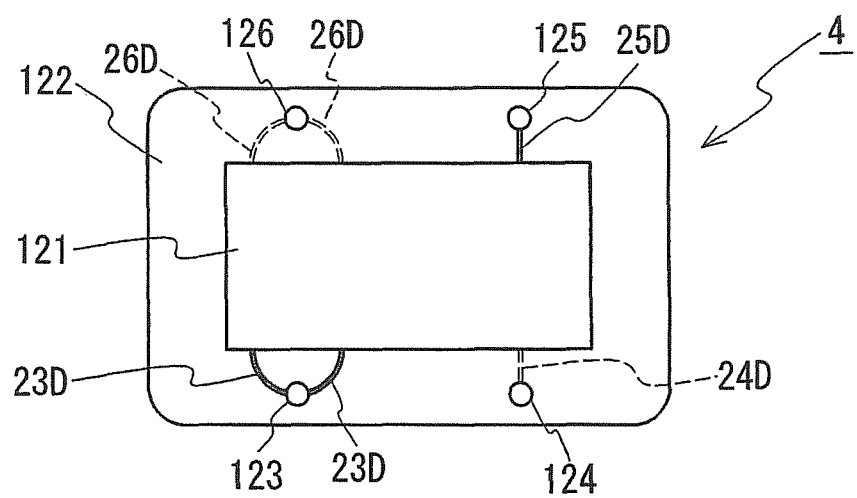
FIG. 4 is a schematic front view of a cell frame according to a fourth embodiment.

FIG. 4 is a schematic front view of a cell frame according to a fourth embodiment. In a cell frame 4 according to the fourth embodiment, a pressure difference is generated between the pressure of the positive electrode electrolyte and the pressure of the negative electrode electrolyte at the position of bipolar plate 121 when the positive electrode electrolyte and the negative electrode electrolyte have substantially the same viscosities.

In cell frame 4 according to the fourth embodiment, both of positive electrode side inlet slits 23D and negative electrode side outlet slits 26D are two slits extending in the shape of an arc, and have an identical structure. Both of a negative electrode side inlet slit 24D and a positive electrode side outlet slit 25D are one slit extending linearly, and have an identical structure. In cell frame 4 according to the fourth embodiment, however, the structure of the positive electrode electrolyte flow path formed of positive electrode side inlet slits 23D and positive electrode side outlet slit 25D and the structure of the negative electrode electrolyte flow path formed of negative electrode side inlet slit 24D and negative electrode side outlet slits 26D are different.

Figure 5:
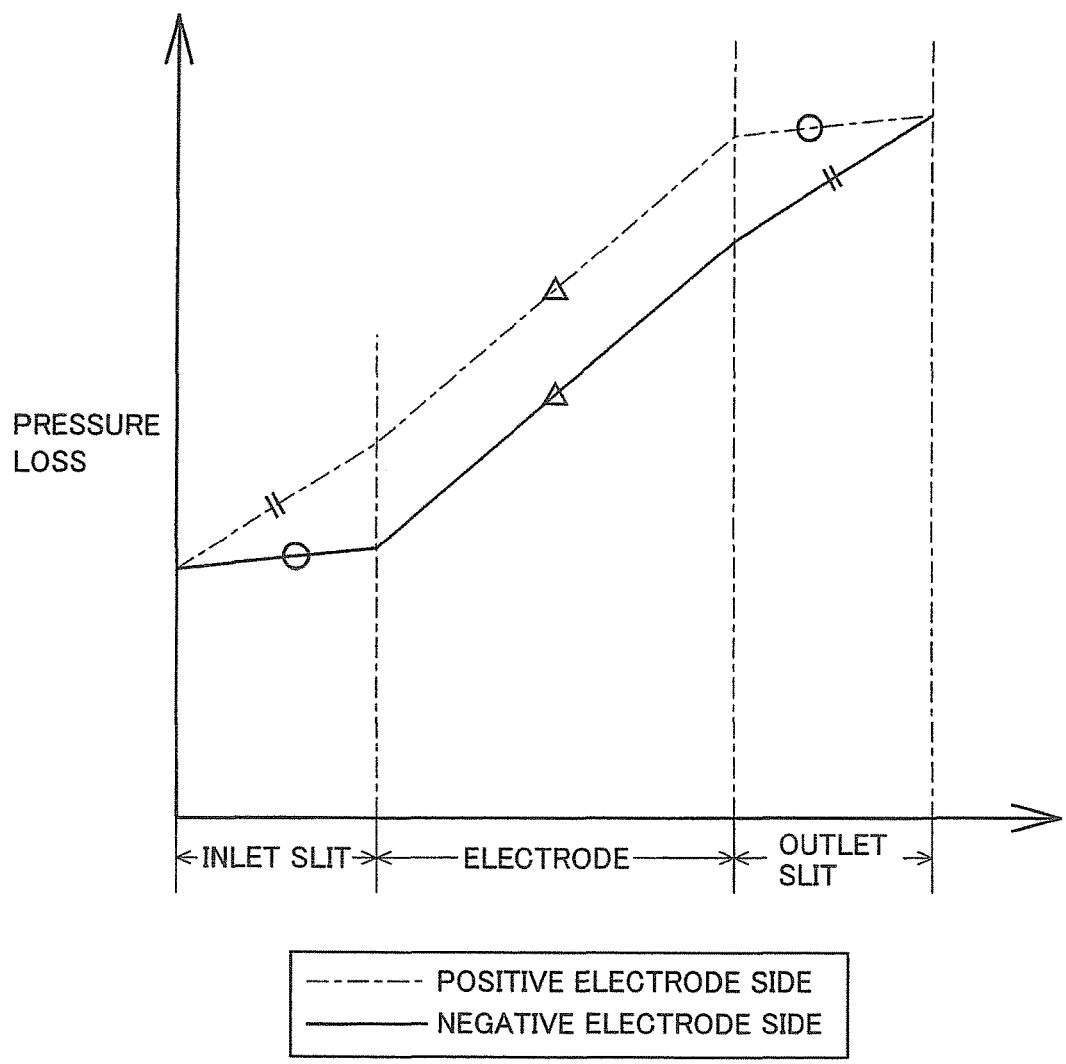
FIG. 5 is a graph illustrating relation between a pressure loss in a positive electrode electrolyte and a pressure loss in a negative electrode electrolyte between an inlet slit and an outlet slit, when the positive electrode electrolyte and the negative electrode electrolyte having the same viscosity are passed through the cell frame according to the fourth embodiment.

FIG. 5 is a graph illustrating relation between a pressure loss in the positive electrode electrolyte and a pressure loss in the negative electrode electrolyte between the inlet slits and outlet slits, when the positive electrode electrolyte and the negative electrode electrolyte having substantially the same viscosities are passed through cell frame 4 according to the fourth embodiment. A horizontal axis of FIG. 5 represents a position between the beginnings of the inlet slits (positive electrode side inlet slits 23D, negative electrode side inlet slit 24D) and the ends of the outlet slits (positive electrode side outlet slit 25D, negative electrode side outlet slits 26D), while a vertical axis of FIG. 5 represents the magnitude of pressure loss at each position. A solid line in the graph of FIG. 5 represents the pressure loss in the negative electrode electrolyte, and a dotted line in the graph of FIG. 5 represents the pressure loss in the positive electrode electrolyte. The pressure losses were obtained by calculation based on the viscosities of the electrolytes and the shapes of the slits.

As shown in FIG. 5, while the pressure loss in the positive electrode electrolyte and the pressure loss in the negative electrode electrolyte are the same at the beginnings of the inlet slits (the positions of positive electrode liquid supply manifold 123 and negative electrode liquid supply manifold 124), the pressure loss in the positive electrode electrolyte is higher than the pressure loss in the negative electrode electrolyte at the ends of the inlet slits (the positions where the manifolds are connected to bipolar plate 121). This difference in pressure loss results from the difference in structure between positive electrode side inlet slits 23D and negative electrode side inlet slit 24D.

The difference in pressure loss generated by the difference in structure between positive electrode side inlet slits 23D and negative electrode side inlet slit 24D is maintained at the position of bipolar plate 121. The difference in pressure loss between the pressure loss in the positive electrode electrolyte and the pressure loss in the negative electrode electrolyte decreases through the outlet slits (positive electrode side outlet slit 25D, negative electrode side outlet slits 26D), and the pressure loss in the positive electrode electrolyte and the pressure loss in the negative electrode electrolyte become the same at the ends of the outlet slits (the positions of positive electrode liquid discharge manifold 125 and negative electrode liquid discharge manifold 126). This is because the pressure loss in the negative electrode electrolyte becomes higher than the pressure loss in the positive electrode electrolyte due to the difference in structure between negative electrode side outlet slits 26D and positive electrode side outlet slit 25D.

As described above, in cell frame 4 according to the fourth embodiment, a desired pressure difference can be generated between the pressure of the positive electrode electrolyte and the pressure of the negative electrode electrolyte at the position of bipolar plate 121, even when the positive electrode electrolyte and the negative electrode electrolyte have substantially the same viscosities.

Furthermore, in cell frame 4 according to the fourth embodiment, the pressure loss in the positive electrode electrolyte and the pressure loss in the negative electrode electrolyte can be the same at the beginnings of the inlet slits, while the pressure loss in the positive electrode electrolyte and the pressure loss in the negative electrode electrolyte can also be the same at the ends of the outlet slits.

A cell stack may be formed by repeatedly stacking the cell frames according to the first to fourth embodiments, positive electrode 104, ion exchange film 101 and negative electrode 105 in this order, and sandwiching and clamping the stack between two end plates 210 and 220, as shown in FIG. 10, for example.

An RF battery may be formed of the cell stack including the cell frames according to the first to fourth embodiments, a positive electrode circulation mechanism for circulating a positive electrode electrolyte through the cell stack, and a negative electrode circulation mechanism for circulating a negative electrode electrolyte through the cell stack.

Fifth Embodiment

In a fifth embodiment, the effect of reducing a shunt current loss in an RF battery was evaluated. The RF battery utilized a cell stack configured such that the structures of electrolyte flow paths are different between a cell frame positioned at the center of the cell stack and cell frames positioned at the ends, and electrical resistance in the electrolyte flow paths increases from the cell frame positioned at the center toward the cell frames positioned at the ends.

Figure 11:
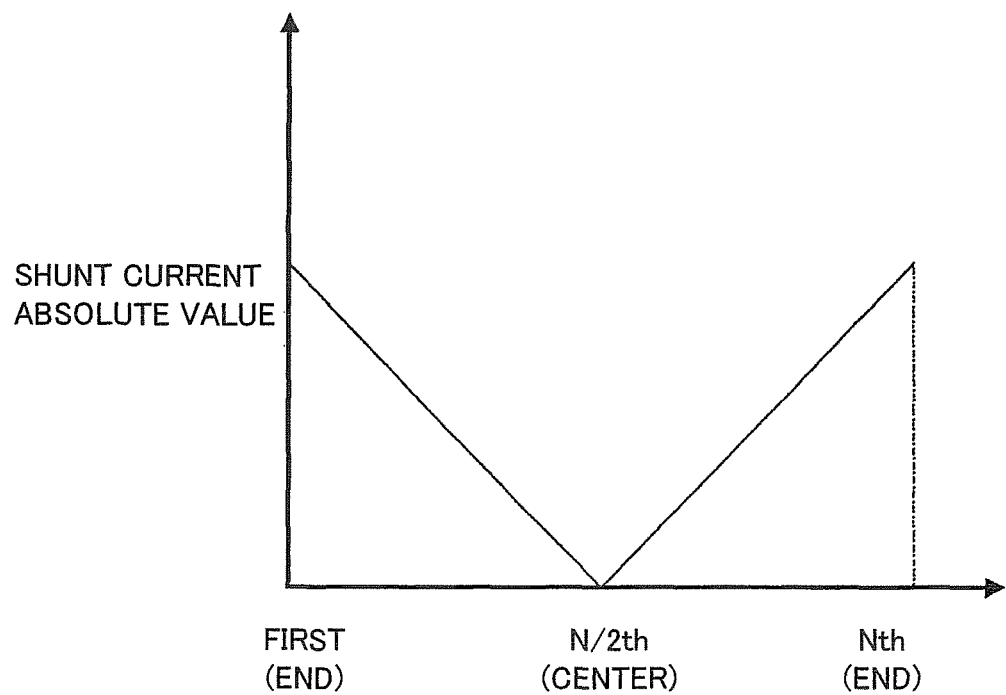
FIG. 11 illustrates relation between a shunt current and the position of a cell frame in a cell stack including N cell frames stacked.

FIG. 11 illustrates relation between a shunt current (absolute value) and the position of a cell frame in a cell stack, the cell stack including N cell frames stacked and having identical structures of electrolyte flow paths (positive electrode electrolyte flow path and negative electrode electrolyte flow path) provided in the cell frames. As shown in FIG. 11, the shunt current becomes 0 at a cell frame positioned at the center (N/2th), and increases according to a linear function from the center toward the ends and reaches its maximum value at the cell frames at opposing ends (first and Nth).

The shunt current was calculated in the cell stack designed such that the structures of the electrolyte flow paths are different between the center and the ends and electrical resistance in the electrolyte flow paths increases from the center toward the ends, in order to suppress the shunt current generated in the cell frames positioned at the ends. Here, shunt currents in cell stacks designed with the following two methods were calculated. In each of the following two design methods, the electrical resistance in the electrolyte flow paths was increased from the center toward the ends, and was distributed symmetrically with respect to the central cell frame.

(I) The cell stack was designed such that the electrical resistance in the electrolyte flow paths increases from the center toward the ends according to a linear function (II) The cell stack was designed such that the electrical resistance in the electrolyte flow paths increases from the center toward the ends according to a quadratic function Electrical resistance in an electrolyte flow path can be increased with at least one method selected from the group consisting of (a) increasing the length of slits, (b) reducing the cross-sectional area of slits, and (c) reducing the number of slits. Here, for brevity of description, an example where the electrical resistance was increased by changing only the length of slits of an electrolyte flow path will be described as an example. The structures of a positive electrode electrolyte flow path and a negative electrode electrolyte flow path are identical in each cell frame, and the structures of an inlet slit and an outlet slit are also identical in each electrolyte flow path.

(Calculation Conditions)

Twenty-one cell frames were stacked. From a cell frame positioned at one end toward a cell frame positioned at the other end, the cell frames were numbered No. 0, No. 1, ..., No. 19, and No. 20 (the cell frame positioned at the center being numbered No. 10). The lengths of slits of the electrolyte flow paths in the cell frame positioned at the center were fixed to 500 mm, and the lengths of slits of the electrolyte flow paths in the cell frames positioned at the ends were fixed to 1000 mm. The structures of the electrolyte flow paths were identical between the cell frames positioned symmetrically (No. 0 and No, 20, No. 1 and No. 29, . . . ) with respect to the cell frame positioned at the center (No. 10). In view of the symmetry, a half portion of the cell stack (from the cell frame No. 10 at the center to the cell frame No. 20 at the end) was subjected to calculation.

Figure 6:
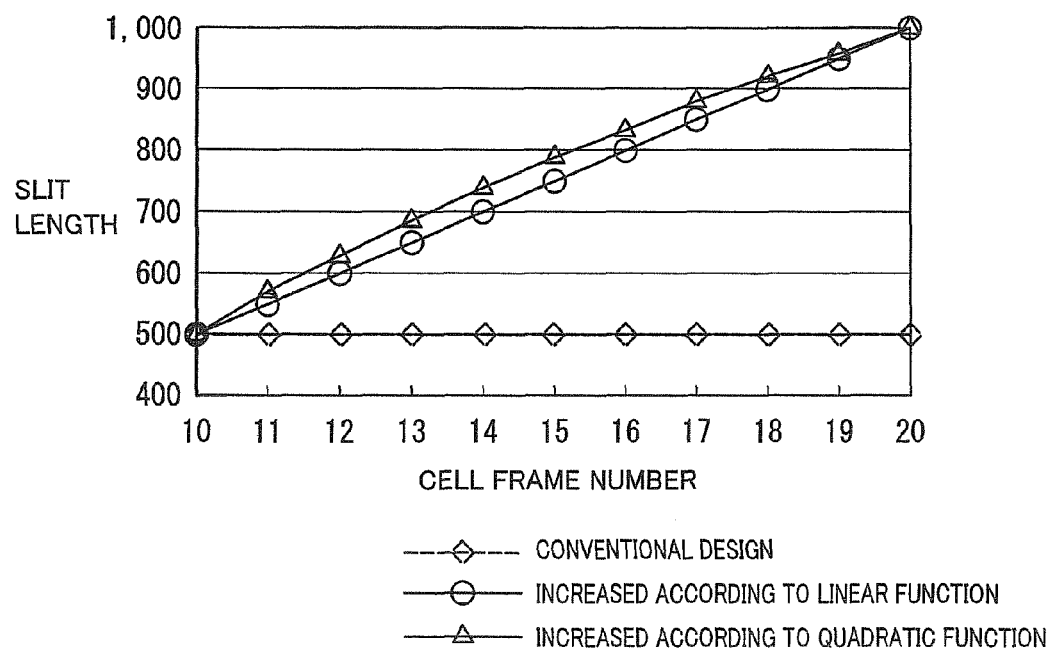
FIG. 6 illustrates relation between the position of a cell frame in a cell stack according to a fifth embodiment and the length of slits of that electrolyte flow path.

FIG. 6 illustrates relation between the length of slits and the cell frames in the cell stacks designed such that the electrical resistance was increased according to a linear function with the above design method (I), and such that the electrical resistance was increased according to a quadratic function with the above design method (II), based on the above conditions. FIG. 6 also illustrates, for comparison purposes, relation between the length of slits and the cell frames in a cell stack designed in a conventional manner. In the conventional design, the lengths of slits of electrolyte flow paths were constant (500 mm) in each cell frame regardless of its position in the stack, and electrical resistance in the electrolyte flow paths was constant from the center toward the ends.

Figure 7:
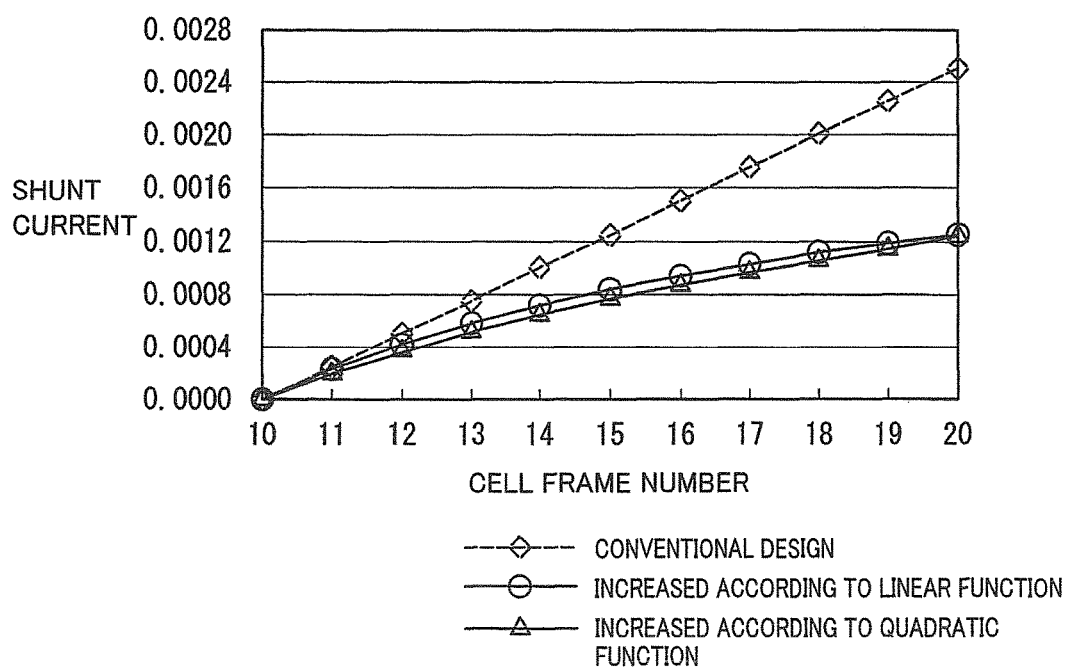
FIG. 7 illustrates relation between the position of a cell frame in the cell stack according to the fifth embodiment and a shunt current.

Then, other parameters such as physical property values of the electrolytes were set as appropriate, and the shunt current was calculated in the cell stacks in which the electrical resistance was increased according to a linear function (design method (I)) and in which the electrical resistance was increased according to a quadratic function (design method (II)), respectively. The shunt current was also calculated in the cell stack designed in a conventional manner (the electrical resistance in the electrolyte flow paths being constant from the center toward the ends). FIG. 7 illustrates relation between the shunt current and the cell frames in the cell stack in each case.

Figure 8:
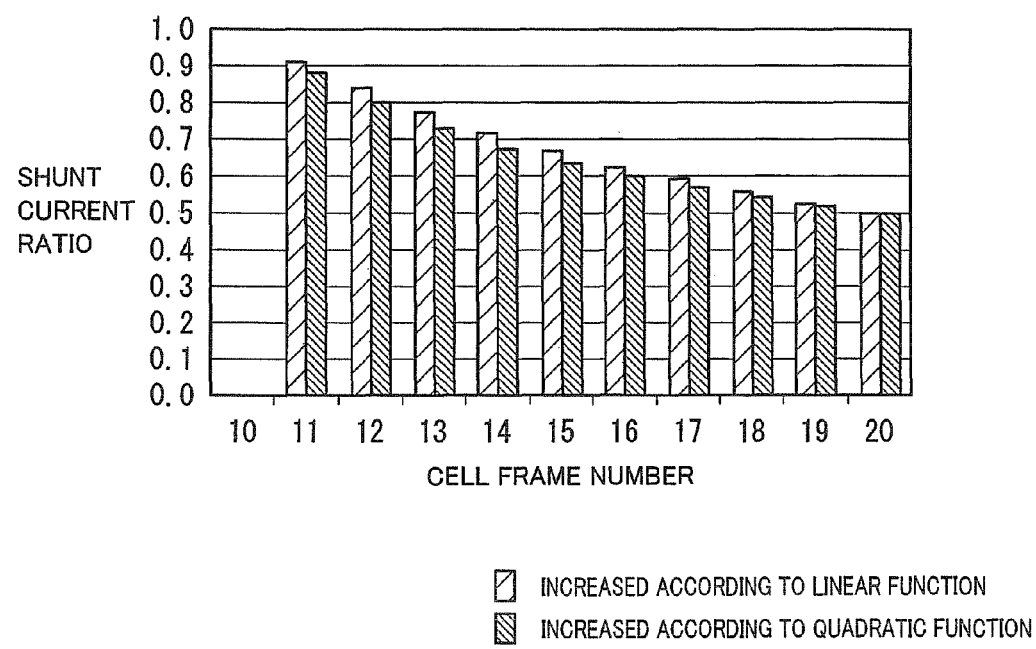
FIG. 8 illustrates relation between the position of a cell frame in the cell stack according to the fifth embodiment and a suppression ratio of the shunt current.
Figure 9:
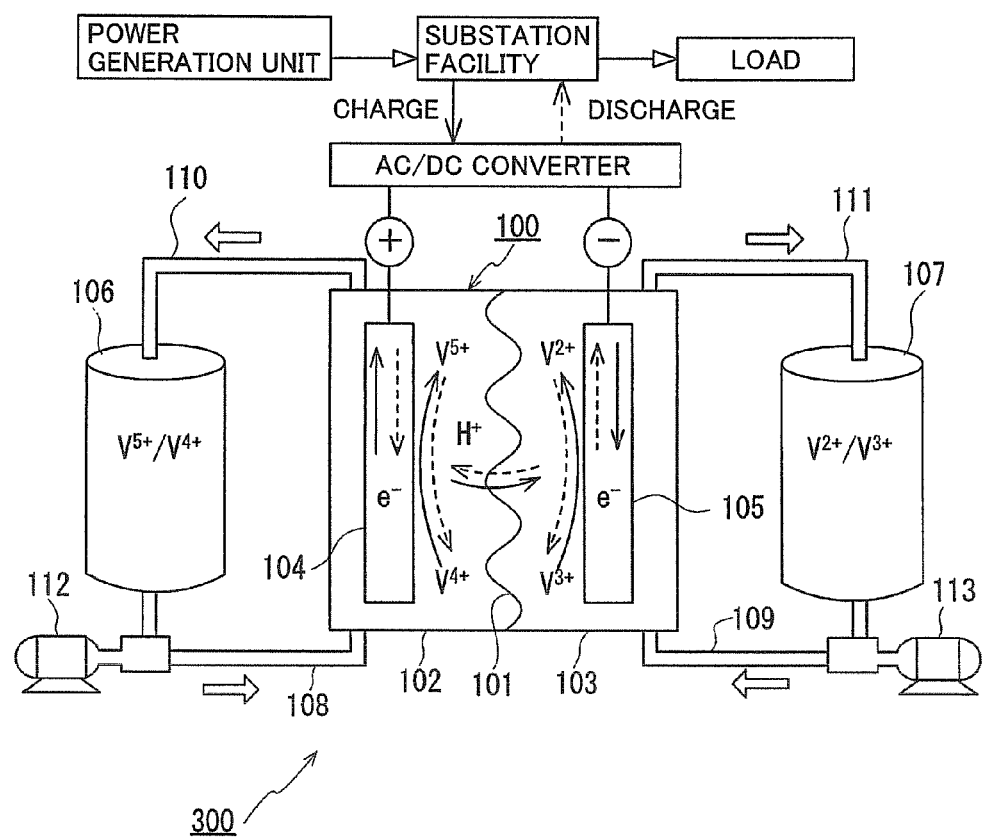
FIG. 9 illustrates the principle of operation of a conventional redox flow battery.

Moreover, the shunt currents in the cell frames in which the electrical resistance was increased according to a linear function (design method (I)) and in which the electrical resistance was increased according to a quadratic function (design method (II)) were normalized with the shunt current in the cell frame designed in a conventional manner. FIG. 8 illustrates relation between a suppression ratio of the shunt current and the cell frames in the cell stack in each case.

As is clear from FIG. 7, in the cell stacks designed such that the electrical resistance in the electrolyte flow paths increases (the length of the slits increases) from the center toward the end (the cell stacks designed with the design method (I) and design method (II)), the shunt current is suppressed in the cell frame positioned at the end compared to the cell stack designed in a conventional manner (the electrical resistance in the electrolyte flow paths being constant from the center toward the end), thereby reducing a shunt current loss.

In addition, as shown in FIG. 8, the length of the slits in the cell frame positioned at the end of the cell stacks designed with the above design method (I) and design method (II) is twice the length of the slits in the cell frame positioned at the end of the cell stack designed in a conventional manner. Thus, the shunt current in the cell frame positioned at the end is suppressed by 50% compared to that in the conventionally designed cell stack. Particularly, when the electrical resistance in the electrolyte flow paths is increased according to a quadratic function from the center toward the end (design method (II)), the total amount of the shunt current is reduced, albeit slightly, compared to that when the electrical resistance is increased according to a linear function (design method (I)), thereby further reducing the shunt current loss.

In this manner, by utilizing the cell stack configured such that the structures of the electrolyte flow paths are different between the cell frame positioned at the center and the cell frame positioned at the end, and the electrical resistance in the electrolyte flow paths increases from the cell frame positioned at the center toward the cell frame positioned at the end, the shunt current loss can be reduced compared to a conventional cell stack having constant electrical resistance in the electrolyte flow paths. According to the above example, for example, the total amount of the shunt current can be suppressed by 50%, to reduce the shunt current loss by 50%.

While the electrical resistance in the electrolyte flow paths is increased by increasing the length of the slits of the electrolyte flow paths in the above example, the electrical resistance in the electrolyte flow paths can also be increased by reducing the cross-sectional area of the slits, or by reducing the number of slits. Therefore, electrical resistance in the electrolyte flow paths in the cell frame positioned at the center and the cell frame positioned at the end can be increased with at least one method selected from the group consisting of (a) increasing the length of slits, (b) reducing the cross-sectional area of slits, and (c) reducing the number of slits. It is preferable to design the cell frame positioned at the center having a small shunt current loss such that the electrical resistance in the electrolyte flow paths is minimized in consideration of a pump loss and the like.

If the cell stack according to the fifth embodiment includes at least one of the cell frames according to the first to fourth embodiments, the shunt current loss can be reduced, and a relative balance between the pressure of the positive electrode electrolyte and the pressure of the negative electrode electrolyte can be adjusted to a desired value regardless of the viscosities of the positive electrode electrolyte and the negative electrode electrolyte.

The present invention is not limited to the embodiments described above but can be modified and practiced as appropriate without deviation from the gist of the present invention. For example, the ions used in the electrolytes are not limited to a vanadium ion. An iron-chromium-based RF battery containing an Fe ion in a positive electrode electrolyte and a Cr ion in a negative electrode electrolyte may be used. Alternatively, a manganese-titanium-based RF battery containing a Mn ion in a positive electrode electrolyte and a Ti ion in a negative electrode electrolyte may be used.

While the embodiments of the present invention have been described above, it is also originally intended to combine the features of the above embodiments together as appropriate.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is suitably applicable to a cell frame, a cell stack, and an RF battery.

REFERENCE SIGNS LIST

1, 2, 3, 4 cell frame; 23A, 23B, 23C, 23D positive electrode side inlet slit; 24A, 24B, 24C, 24D negative electrode side inlet slit; 25A, 25B, 25C, 25D positive electrode side outlet slit; 26A, 26B, 26C, 26D negative electrode side outlet slit; 100 cell; 101 ion exchange film; 102 positive electrode cell; 103 negative electrode cell; 104 positive electrode; 105 negative electrode; 106 positive electrode electrolyte tank; 107 negative electrode electrolyte tank; 108, 109, 110, 111 pipe; 112, 113 pump; 120 cell frame; 121 bipolar plate; 122 frame body; 123 positive electrode liquid supply manifold; 124 negative electrode liquid supply manifold; 125 positive electrode liquid discharge manifold; 126 negative electrode liquid discharge manifold; 127 sealing member; 200 cell stack; 210, 220 end plate; 300 RF battery.

The invention claimed is:

1. A redox flow battery comprising a cell frame comprising a frame body and a bipolar plate integrated with said frame body,
said frame body including
a positive electrode liquid supply manifold and a positive electrode liquid discharge manifold which are provided through said frame body and through which a positive electrode electrolyte passes, a positive electrode electrolyte flow path provided on one surface side of said frame body, said positive electrode electrolyte flow path including a positive electrode side inlet slit for introducing said positive electrode electrolyte from said positive electrode liquid supply manifold to a positive electrode provided on one surface side of said bipolar plate, and a positive electrode side outlet slit for discharging said positive electrode electrolyte from said positive electrode to said positive electrode liquid discharge manifold, a negative electrode liquid supply manifold and a negative electrode liquid discharge manifold which are provided through said frame body and through which a negative electrode electrolyte passes, and a negative electrode electrolyte flow path provided on the other surface side of said frame body, said negative electrode electrolyte flow path including a negative electrode side inlet slit for introducing said negative electrode electrolyte from said negative electrode liquid supply manifold to a negative electrode provided on the other surface side of said bipolar plate, and a negative electrode side outlet slit for discharging said negative electrode electrolyte from said negative electrode to said negative electrode liquid discharge manifold, the structure of said positive electrode electrolyte flow path and the structure of said negative electrode electrolyte flow path being different from each other.

2. The redox flow battery according to claim 1, wherein the structure of the positive electrode side inlet slit and the structure of the positive electrode side outlet slit are different from each other in said positive electrode electrolyte flow path, and the structure of the negative electrode side inlet slit and the structure of the negative electrode side outlet slit are different from each other in said negative electrode electrolyte flow path.

3. The redox flow battery according to claim 1, wherein the length of the slits of said positive electrode electrolyte flow path and the length of the slits of said negative electrode electrolyte flow path are different from each other.

4. The redox flow battery according to claim 1, wherein the cross-sectional shape of at least a portion of said positive electrode electrolyte flow path and the cross-sectional shape of at least a portion of said negative electrode electrolyte flow path are different from each other.

5. The redox flow battery according to claim 1, wherein the cross-sectional area of at least a portion of said positive electrode electrolyte flow path and the cross-sectional area of at least a portion of said negative electrode electrolyte flow path are different from each other.

6. The redox flow battery according to claim 1, wherein the number of slits forming said positive electrode electrolyte flow path and the number of slits forming said negative electrode electrolyte flow path are different from each other.

7. The redox flow battery according to claim 2, wherein the structure of said positive electrode side inlet slit and the structure of said negative electrode side outlet slit are identical to each other, and the structure of said positive electrode side outlet slit and the structure of said negative electrode side inlet slit are identical to each other.

8. The redox flow battery according to claim 1 comprising a positive electrode, a negative electrode, and an ion exchange film a plurality of times.

9. The redox flow battery according to claim 1 comprising a cell stack, a positive electrode circulation mechanism for circulating a positive electrode electrolyte through said cell stack, and a negative electrode circulation mechanism for circulating a negative electrode electrolyte through said cell stack.

* * * * *